May 22, 1923.
G. J. MacDOWELL ET AL
1,456,137
CAMERA SHUTTER OPERATING MECHANISM
Filed Sept. 1, 1920
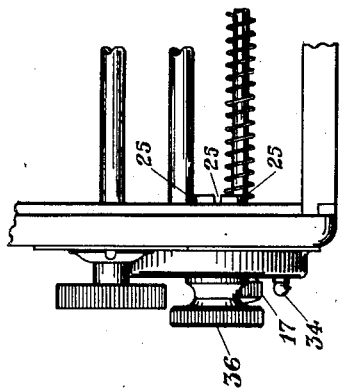
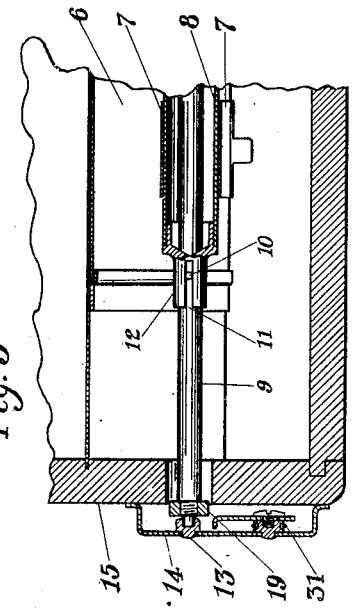
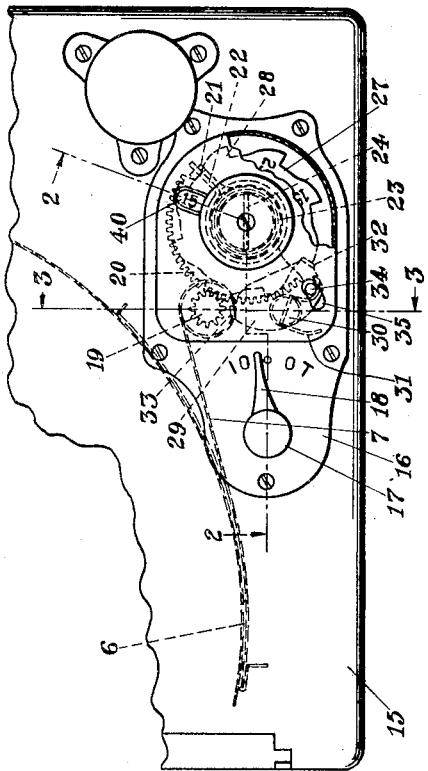
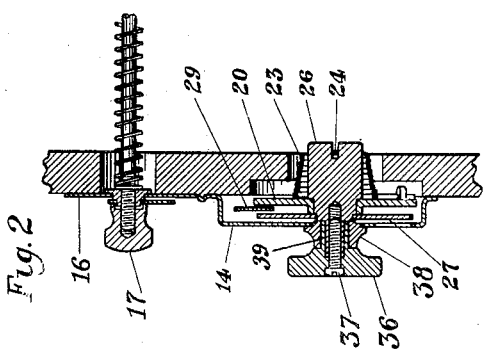
*Inventors:*
*Glenn J. MacDowell*
*Mason H. Jones*
By *Gabel & Mueller*
*Attorney*

Patented May 22, 1923.

1,456,137

UNITED STATES PATENT OFFICE.

GLENN J. MacDOWELL AND MASON H. JONES, OF CHICAGO, ILLINOIS, ASSIGNORS TO SUPER REFLEX COMPANY, OF CHICAGO, ILLINOIS.

CAMERA-SHUTTER-OPERATING MECHANISM.

Application filed September 1, 1920. Serial No. 407,289.

*To all whom it may concern:*

Be it known that we, GLENN J. MAC-DOWELL and MASON H. JONES, citizens of the United States, residing at Chicago, in the county of Cook and State of Illinois, have invented a certain new and useful Improvement in Camera-Shutter-Operating Mechanism, of which the following is a full, clear, concise, and exact description, reference being had to the accompanying drawings, forming a part of this specification.

This invention relates to photographic cameras and more particularly to a new and improved camera shutter operating mechanism.

It is a purpose of the invention to provide a shutter operating mechanism wherein the shutter is operated by a spring, and wherein the speed of travel of the shutter may be varied by varying the tension of the spring. It is a further purpose of the invention to provide new and improved means for varying the tension of the spring, together with indicating means operating in conjunction therewith.

It is a particular object of the invention to provide a shutter operating mechanism of the above character for actuating the shutter in a reflex camera, wherein the reflector element is moved out of its interposed position between the lens and sensitized element, after which the shutter is operated so as to move the same into position to close the camera aperture such as shown in the application of Abe Sackheim and Mason H. Jones, Serial No. 407,293, filed Sept. 1, 1920. The time during which the aperture is open, or the length of the exposure in such a camera is dependent upon the period of time that elapses between the passing of the reflector element from in front of the aperture, and the passing of the shutter element into position in front of the said aperture. In such cameras the velocity of the reflector element is constant and the length of the exposure being dependent upon the difference in speed between the reflector element and shutter, it is in inverse proportion to the speed of the shutter. By varying the tension on the spring operating the shutter the speed thereof, is varied, in the present invention to obtain the desired length of exposure, and the indicating device is provided with markings to indicate the length of exposure, for the tension at which the spring is set.

It is also a purpose of the invention to provide suitable ratchet mechanism, whereby the tension of the spring is adjusted to tighten the same by the turning of a thumb screw and when the tension is decreased by a step by step release thereof by a pawl device similar to the escapement on a watch.

Other objects and advantages of the invention will appear as the description of the accompanying drawings proceeds wherein is shown one form that the invention may take. It is however to be distinctly understood that the invention is not to be limited to the exact details of structure shown and described in the specification, but that such changes or modifications are to be included therein as would suggest themselves to a person skilled in this art, and that would fall within the scope of the claims.

In the drawings:

Fig. 1 is a fragmentary side elevation of a camera, showing the invention applied thereto, certain internal parts thereof being shown in dotted lines;

Fig. 2 is a section taken on the line 2—2 of Fig. 1;

Fig. 3 is a section taken on the line 3—3 of Fig. 1; and

Fig. 4 is a fragmentary end view of the camera with the front thereof removed showing the relationship of the spring shutter operating mechanism to the winding spool and stop mechanism.

Referring in detail to the drawings the shutter operating mechanism comprises the flexible member 7 secured to the shutter 6 which is wound on the spool 8 carried by the shaft 9. The spool 8 is secured to the shaft 9 in any suitable manner as by means of the pin 10 passing through the slot 11 in the narrow extension 12 of the spool. The shaft 9 is suitably journaled in the camera box in any suitable manner at the right hand end thereof as shown in Fig. 3, this portion being broken away in Fig. 3 and is journaled at the opposite end thereof in a bearing 13 provided in the plate 14, which is suitably secured to the camera box 15 in any desired manner. The plate 14 is provided with an extension 16 having a knurled operating knob 17 mounted therein and provided with a pointer 18, the thumbscrew or knob 17 being adapted to set the camera for a time exposure or snap shot as desired.

Mounted to turn with the shaft 9 is a pinion 19 which is shown in Fig. 3 as being screw threaded thereon. The teeth of the pinion 19 are adapted to mesh with the teeth on the sector gear 20, which is provided with an eye 21 for receiving the end portion 22 of the coil spring 23, the other end 24 of which is adapted to be seated in any one of a plurality of transverse grooves 25 extending across the inner end of the spindle 26. Mounted to turn with the spindle 26 is a ratchet wheel 27, the teeth 28 of which are adapted to engage with a pawl 29, which is mounted on a suitable pin 30 having a suitable spring 31 coiled about the same, the spring being so mounted as to urge the finger 32 thereon into engagement with the tooth 28 of the ratchet opposite the same. The pawl is also provided with a finger 33 on the opposite side of the pivot from the finger 32, which is adapted to engage one of the teeth opposite the same when the pawl 29 is moved clockwise as shown in Fig. 1 by means of the finger piece 34 projecting through the slot 35 in the plate 14. The spindle 26 is provided with a thumb screw 36 so that the parts are secured as a unit by means of the screw 37, a collar 38 being mounted between the inner end portion of the thumb screw and the outer end portion of the spindle 26, which collar extends around the shank portion 39 of the thumb screw, thus providing a suitable bearing for the same in the plate 14. When the spindle 26 is turned by means of the thumb piece 36 in a counter clockwise direction when viewed from the outside of the camera as shown in Fig. 1, the spring 23 is put under greater tension as the sector 20 is held in the position shown by the pinion 19. The tension can be adjusted step by step as the ratchet wheel and pawl will hold the part in any desired position. A slot is provided at 40 in the plate 14 through which suitable indicating numerals indicating the time of exposure obtained by the particular tension of the spring can be read.

In order to reduce the tension on the spring the finger piece 34 is moved so as to disengage the projection or tooth 32 of the pawl from its ratchet tooth 28, after which the ratchet wheel will turn in a clockwise direction due to the tension of the spring until the tooth adjacent to the projection 33 strikes the projection 33, which will then be in such position as to engage with the tooth near the same. It is of course understood that the teeth on the ratchet wheel engage the outer side of the tooth 32 and the inner side of the tooth 33. This operation can be repeated until the desired tension is obtained on the spring by the step by step movement of the ratchet wheel 27 to the proper position for such tension which will be indicated by a numeral at the slot 40. The numeral will of course indicate the speed of the shutter obtained by the tension under which the spring will then be.

From the above it will be seen that a tension device has been provided whereby any desired velocity of the shutter can be obtained in order to vary the length of time of the exposure of the sensitized member to the light passing through the lens of the camera.

Having thus described our invention what we desire to claim and secure by U. S. Letters Patent is:

1. In a photographic camera of the character described a shutter, a shutter operating mechanism comprising a flexible member secured to said shutter, a shaft journaled in said camera and provided with a winding reel or spool thereon to which said flexible member is secured, spring means for actuating said shaft to wind said flexible member on said reel or spool, and means for adjusting the tension of said spring means, whereby the speed of said shutter may be adjusted, said tension adjusting means comprising a ratchet wheel, a sector gear actuating said shaft, a spring having its opposite ends secured to move with said ratchet wheel and said sector gear respectively, means for turning said ratchet wheel, and means for holding said ratchet wheel in any desired position.

2. In a photographic camera of the character described a shutter, a shutter operating mechanism comprising a flexible member secured to said shutter, a shaft journaled in said camera and provided with a winding reel or spool thereon to which said flexible member is secured, spring means for actuating said shaft to wind said flexible member on said reel or spool, and means for adjusting the tension of said spring means, whereby the speed of said shutter may be adjusted, said tension adjusting means comprising a ratchet wheel, a spindle moving as a unit therewith, a sector gear actuating said shaft, a coil spring having its opposite ends secured to said sector gear and said spindle respectively, means for turning said spindle and ratchet wheel, and means for holding said ratchet wheel in any desired position.

3. In a photographic camera of the character described a shutter, a shutter operating mechanism comprising a spring tension device, flexible means connecting said shutter and said tension device and means for adjusting the tension thereof to adjust the speed of said shutter, said means comprising a sector gear, a ratchet wheel, a spring having its opposite ends secured to move with said ratchet wheel and said sector gear respectively, means for turning said ratchet wheel, and means for holding said ratchet wheel in any desired position.

4. In a photographic camera of the character described a shutter, a shutter operating mechanism comprising a spring tension device, flexible means connecting said shutter and said tension device and means for adjusting the tension thereof to adjust the speed of said shutter, said means comprising a sector gear, a spindle, a ratchet wheel mounted to move as a unit with said spindle, a spring having its opposite ends secured to said spindle and said sector gear, means for turning said spindle to increase the tension of said spring, and means cooperating with said ratchet wheel to hold said spindle in any desired position.

5. In a photographic camera of the character described a shutter, a shutter operating mechanism comprising a spring tension device, flexible means connecting said shutter and said tension device and means for adjusting the tension thereof to adjust the speed of said shutter, said means comprising a sector gear, a spindle, a ratchet wheel mounted to move as a unit with said spindle, a spring having its opposite ends secured to said spindle and said sector gear, means for turning said spindle to increase the tension of said spring, and means cooperating with said ratchet wheel to hold said spindle in any desired position and being adapted to relieve the tension on said spring step by step.

6. In a photographic camera of the character described a shutter, a shutter operating mechanism comprising a spring tension device, flexible means connecting said shutter and said tension device and means for adjusting the tension thereof to adjust the speed of said shutter, said means comprising a sector gear, a spindle, a ratchet wheel mounted to move as a unit with said spindle, a spring having its opposite ends secured to said spindle and said sector gear, means for turning said spindle to increase the tension of said spring, a pawl cooperating with said ratchet wheel to hold said spindle in any desired position, and means adapted to actuate said pawl to relieve the tension on said spring step by step.

7. In a photographic camera of the character described a shutter, a shutter operating mechanism comprising a spring tension device, flexible means connecting said shutter and said tension device and means for adjusting the tension thereof to adjust the speed of said shutter, said means comprising a sector gear, a spindle, a ratchet wheel mounted to move as a unit with said spindle, a spring having its opposite ends secured to said spindle and said sector gear, means for turning said spindle to increase the tension of said spring, a pawl having teeth at the opposite ends thereof, one of said teeth normally cooperating with said ratchet wheel to hold said spindle in any desired position as the tension on said spring is increased, and means for actuating said pawl so that the other of said teeth will cooperate with said ratchet to relieve the tension on said spring step by step.

In witness whereof, we hereunto subscribe our names this 4th day of August, A. D., 1920.

GLENN J. MacDOWELL.
MASON H. JONES.